(12) United States Patent
Fisher et al.

(10) Patent No.: US 8,740,061 B2
(45) Date of Patent: Jun. 3, 2014

(54) RECORDING INFORMATION FOR A WEB MANUFACTURING PROCESS

(75) Inventors: Gail Fisher, San Diego, CA (US); Mitchell Glen Moeller, Moseley, VA (US); Morad M. Samii, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/542,872

(22) Filed: Jul. 6, 2012

(65) Prior Publication Data
US 2014/0008426 A1    Jan. 9, 2014

(51) Int. Cl.
*G06F 17/00* (2006.01)

(52) U.S. Cl.
USPC .......................................................... 235/375

(58) Field of Classification Search
USPC .............................. 235/375, 376; 101/92, 483
See application file for complete search history.

(56) References Cited

U.S. PATENT DOCUMENTS

| | | | |
|---|---|---|---|
| 7,810,731 B2 | 10/2010 | Johnson | |
| 7,848,202 B2 | 12/2010 | Kuroda | |
| 8,045,219 B2 | 10/2011 | Pruden | |
| 8,398,793 B2 * | 3/2013 | Andrews et al. | 156/64 |
| 2006/0213417 A1 * | 9/2006 | Codos et al. | 112/475.08 |
| 2010/0194791 A1 * | 8/2010 | Ogi et al. | 345/691 |
| 2011/0064507 A1 * | 3/2011 | McLaughlin | 400/612 |

FOREIGN PATENT DOCUMENTS

| | | |
|---|---|---|
| JP | 2007059013 | 3/2007 |
| JP | 2010211855 | 9/2010 |

OTHER PUBLICATIONS

AGFA, Press Release, AGFA Graphics Launches :ApogeeX with Automatic Barcode Generation, Jul. 2007 (3 pages).

* cited by examiner

*Primary Examiner* — Edwyn Labaze

(57) ABSTRACT

A web manufacturing process includes recording, onto an excess trim region of a web that is a subject of the web manufacturing process, information relating to a processing stage of the web manufacturing process.

18 Claims, 4 Drawing Sheets

RECORDING INFORMATION FOR A WEB MANUFACTURING PROCESS

BACKGROUND

A web manufacturing process refers to a process of making target products on a web. Target products can include finished goods or intermediate goods used for subsequent operations. A "web" can include a sheet-like or long-wound roll substrate that is continuously processed by one or multiple stages of a web manufacturing infrastructure used in the web manufacturing process or a unit operation. Examples of a web include a roll of paper or other material that can be processed to form a target finished paper (such as photo paper onto which images can be printed), sheet metal or other material onto which solar cells or other elements can be formed, a substrate onto which organic light-emitting diodes (OLEDs) or other components can be formed, and so forth. The various stages of a web manufacturing infrastructure can apply respective different manufacturing processes with respect to the web.

BRIEF DESCRIPTION OF THE DRAWINGS

Some embodiments are described with respect to the following figures.

DETAILED DESCRIPTION

Figure 1:
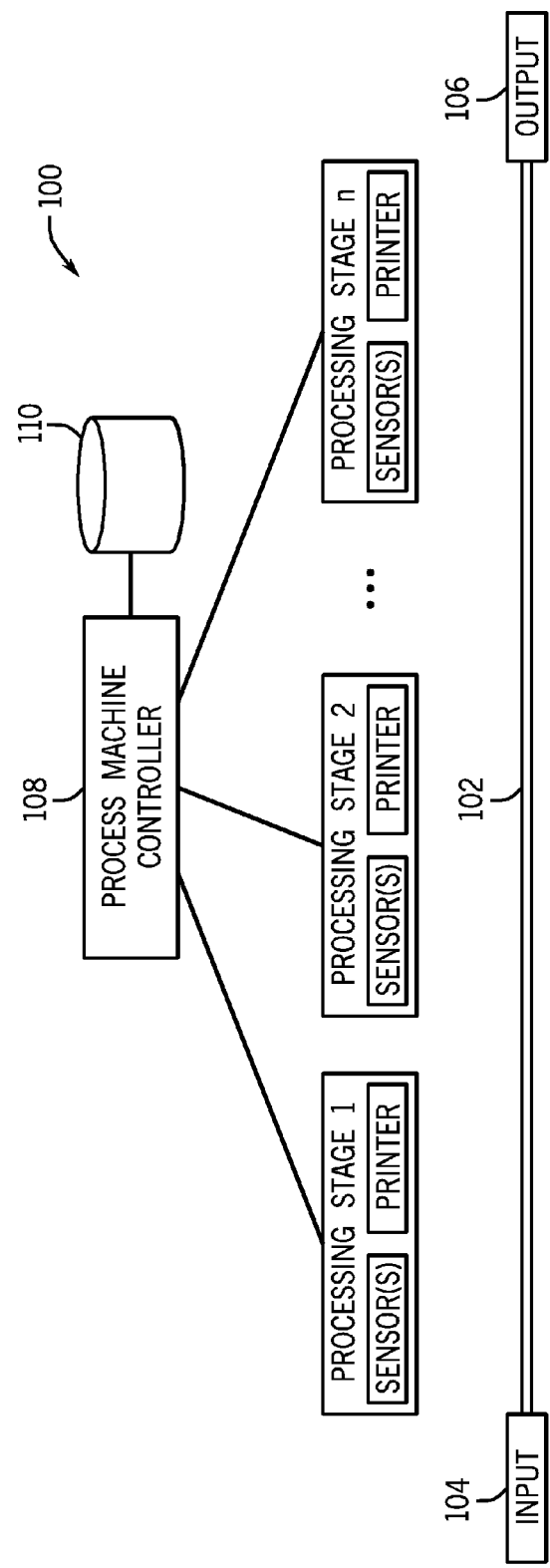
FIG. 1 illustrates an example arrangement for a web manufacturing process, according to some implementations.

A benefit of using a web manufacturing process is process continuity, since webs can be continuously processed by at least a combination of some processing stages of a web manufacturing infrastructure, which can increase manufacturing throughput and reduce manufacturing cost. A web can refer to any underlying structure on which manufacturing processes can be applied continuously by corresponding processing stages of the web manufacturing infrastructure. As used here, manufacturing processes can also refer to processes for building a web, or alternatively, can refer to unit operations that are performed with respect to a web. For example, a manufacturer of a web can supply the web to a downstream entity, which can in turn apply a further operation or operations, referred to as unit operation(s), on the web (such as to further finish the web and so forth). The underlying structure can be subsequently converted to another form, such as a sheet-like substrate or a roll that can be fed through the web manufacturing infrastructure for processing by corresponding processing stages. Examples of a sheet-like substrate or roll can include foil, metal, paper, film, textile, plastic, and so forth. Example manufacturing processes that can be applied on a web include material deposition, coating, plating, printing, patterning, laminating, curing, converting, and so forth.

Quality control can be challenging in a web manufacturing process. The quality of target products resulting from the web manufacturing process can be based on various factors, such as quality of the incoming web, quality of other input materials, consistency of the various manufacturing processes applied on the web, process control of manufacturing-related parameters during the web manufacturing process, and so forth.

With some example web manufacturing processes, when a quality issue is detected, it can be difficult to take efficient corrective action to address the quality issue as it happens, and it can also be difficult to identify a root cause of the quality issue concurrently with the occurrence of the quality issue. A quality issue can refer to a defect associated with target products of the web manufacturing process, where the target products can include finished goods or intermediate goods that are to be further processed or used. A quality issue can also refer to any other condition that may cause an output of a web manufacturing process to be less than optimal or outside of predefined specifications, such as an output that has characteristics outside predefined thresholds or other specifications.

In some cases, a defect can be manually identified by a human inspector, or alternatively, identified by an automated defect detection/inspection system, or other image processing system. In response to the identified defect, a defect map can be generated to show where on a web the defect starts and ends. The defect map can use measurements from a length measurement device (e.g. a yardage meter) that measures a length of the web that has been processed by the web manufacturing infrastructure. However, such a defect map can be inaccurate, since it relies upon proper calibration of the length measurement device as well as the skill of an operator. If the defect map is inaccurate, then that can result in increasing the likelihood of manufacturing a relatively large amount of defective products. An inaccurate defect map may also lead to an increase in wasted web material when conforming materials are incorrectly culled. For example, the inaccurate defect map may lead to culling of a non-defective portion of the web, while a defective portion of the web is left un-culled.

In accordance with some implementations, to allow for more accurate identification of portions of a web associated with defects or other quality issues, techniques or mechanisms are able to physically record information relating to the web manufacturing process and process parameter information onto the web itself at correct positions corresponding to the quality issues. The recorded information can include information regarding a detected quality issue, such as presence of a defect or other condition that is outside predefined threshold(s) or specifications. Alternatively or additionally, recorded information can include information relating to a process parameter (or parameters) associated with a particular processing stage of the web manufacturing infrastructure. The particular processing stage can have sensor(s) to measure the parameter(s), and the measured parameter value(s) can be recorded onto the web for later retrieval, analysis, and downstream action plan determination.

The information relating to the web manufacturing process can be recorded onto an excess trim region of the web. An "excess trim region" refers to a region of the web on which manufacturing processes are not to be applied, or if applied would not be conforming, since manufacturing tolerances may not allow for reliable manufacturing of target products in the excess trim regions. Also, the excess trim regions of the web are intended to be slit or cut from the remainder of the web where the target products are provided, at or near the conclusion of the web manufacturing process.

The recorded information on the web can be used for various purposes. For example, the recorded information can be used by the web manufacturing infrastructure to take a corrective action to address a quality issue. For example, the corrective action can include culling a defective portion of a web. Culling can involve cutting the defective portion of the web, with the remaining portions of the web spliced together after the defective portion is removed.

Another example of a corrective action is to have a downstream processing stage modify its operating parameter in response to recorded information (on the web) indicating a quality issue being present in an upstream processing stage (note that the recorded information was recorded onto the web by the upstream processing stage). The modified behavior of the downstream processing stage can include any one or combination of the following: the downstream processing stage can modify at least one of its parameters (e.g. temperature, pressure, flow rate, time, speed, etc.) to cause manufacturing processing performed by the downstream processing stage to vary from its normal behavior; the downstream processing stage can be controlled to skip application of its manufacturing processing in response to detecting a defective portion of the web, to avoid the possibility of rejecting of a higher value-added material. Note that it would be a wasted step to perform the manufacturing processing since the defective web portion would be culled later anyway. In other examples, the downstream processing stage can perform other modified processes.

Alternatively, the recorded information can be used to perform root cause analysis to identify the root cause of a quality issue. Once the root cause is identified, a corrective action can be taken to address the root cause.

Performing a corrective action based on information recorded onto the web provides the system with an integrated closed-loop control capability.

Examples of information relating to a defect that can be recorded onto a web include any one or combination of the following: defect start point, defect type, defect size, defect location across the web, defect width across the web, defect description, frequency of defect per area, defect start and end points, and so forth. In other examples, other types of information relating to a defect or other quality issue can be recorded. In the ensuing discussion, reference is made to detecting defects on a web and recording information relating to such defects onto the web. Note, however, in other examples, information recorded onto a web can relate to other types of process control quality issues, such as detected variations of measured parameters with respect to predefined thresholds or ranges, conditions that may cause target products of the web manufacturing process to have characteristics that are outside of predefined thresholds, and so forth.

Examples of information relating to parameters that can be recorded onto a web can include any one or combination of the following: an instantaneous web velocity, material flow rate, process temperature, material viscosity, color, clarity, type of material, coating weight, web tension, web temperature, web thickness, machine room temperature, machine room pressure, machine room humidity, outside temperature, outside pressure, outside humidity, power usage, and so forth. Although various example parameters are listed above, it is noted that in other examples, other relevant alternative parameters can be recorded onto the web.

In general, there can be several classes of parameters. One class of parameters include parameters that can indicate disruptive events, such as slugs in a coating on the web, breaks in the web, equipment malfunction, and so forth, which can have an instantaneous negative effect on the finished product quality. Another class of parameters include parameters that can lead to undesirable quality issues over time, such as parameters relating to oven temperatures, moisture content, ambient room conditions, and so forth.

FIG. 1 illustrates an example system for a web manufacturing process. A web 102 is shown provided through a web manufacturing infrastructure 100 that has multiple processing stages (e.g. stage 1, stage 2, and stage n, where n≥2). The web 102 is provided from an input component 104, which can be a source material core onto which the web 102 is initially wound. The web 102, after processing by the processing stages of the web manufacturing infrastructure 100, is provided to an output component 106, which can be a receiving core onto which the processed web 102 is wound. During manufacturing, the web 102 is continuously moved from the input component 104 to the output component 106, or as a contiguous web going through in one pass.

In the example arrangement of FIG. 1, each of the processing stages has a sensor (or multiple sensors), and a printer (or other type of recording device). In accordance with some implementations, the printer at each processing stage can be used to print (or otherwise record) certain information (as discussed further below) onto the web 102 (and more specifically onto an excess trim region of the web 102). In some examples, the information printed onto the web 102 can be visible or invisible to the human eye.

The sensor(s) at each processing stage can be used to detect corresponding process parameter(s) at the corresponding processing stage. The sensor(s) at each of processing stages 2 through n can further include a reader (e.g. an optical reader or other type of reader) to read recorded information on the web. Note that each of the subsequent processing stages 2 through n is considered a downstream processing stage with respect to processing stage 1, which may have printed certain information onto the web 102.

Information relating to a quality issue and/or a manufacturing process parameter that can be recorded onto the web 102 can include encoded information, where encoded information refers to data that has been translated by an encoding function. In some examples, the encoding function can translate input information into a barcode or information according to another format. A barcode can include a combination of bars for encoding information. Alternatively, the barcode can be a matrix barcode or a two-dimensional barcode, such as a QR (quick response) code. Details regarding some implementations of a barcode that can be recorded onto the web 102 are discussed further below.

By recording information pertaining to the web manufacturing process onto the web 102, information associated with specific quality issues can be provided at corresponding portions of the web 102 associated with the quality issues. In this manner, the location of a portion of the web 102 that has the quality issue can be accurately pinpointed, such that appropriate corrective action can be taken with respect to the web portion having the quality issue.

By recording information relating to the web manufacturing process onto the web 102, reliance does not have to be made on generating a defect map or other like data structure based on measurements taken by a length measurement device. As noted above, if the length measurement device is not properly calibrated, then the defect map (or other like data structure) may not be accurate, which may lead to imprecise corrective actions being taken.

It is also noted that information can be recorded onto the web 102 even in the absence of a quality issue associated with a manufacturing processing applied by a processing stage. For example, useful information relating to one or multiple process parameters measured by one or multiple sensors of a given processing stage can also be recorded onto the web 102, regardless of whether or not a quality issue was detected.

Information (including parameter measurements and recorded information read from the web) obtained by the sensor(s) of each processing stage can be communicated to a process machine controller 108 (hereinafter referred to simply as "controller"). Although the controller 108 is depicted as being separate from the processing stages, it is noted that, in some examples, certain portions of the controller 108 can reside in the processing stages, such as in the form of control circuits, processors, and so forth.

The controller 108 can process received information, and based on the received information, can perform corresponding control actions. For example, if the controller 108 determines that a quality issue is present at processing stage 1 in FIG. 1, the controller 108 can cause processing stage 1 to record information relating to the quality issue onto the web 102, as discussed above.

In some implementations, in response to detecting the quality issue at processing stage 1, the controller 108 can also cause processing stage 1 to take corrective action, such as to remove a portion of the web 102 that has the quality issue.

In other implementations, instead of performing the corrective action at processing stage 1, the corrective action can be performed at a downstream processing stage (such as any of processing stages 2 through n), based on recorded information on the web 102 read by the downstream processing stage. Using the recorded information read from the web 102, the downstream processing stage can pinpoint and remove or otherwise compensate for the indicated quality issue, if possible. For example, the downstream processing stage can modify at least one parameter relating to the manufacturing processing applied by the downstream processing stage, to compensate for the quality issue at processing stage 1. Alternatively, another corrective action that can be taken by the downstream processing stage is to cull a portion of the web 102 that has the quality issue.

Alternatively, the controller 108 can, instead of determining a corrective action to take, identify a root cause of the quality issue, such that the web manufacturing infrastructure 100 can be adjusted to prevent the quality issue from occurring in the future.

Using techniques or mechanisms according to some implementations, quality issue removal and/or tracking is improved. Moreover, web material waste is reduced since locations of defects can be more accurately pinpointed. In addition, root cause determination can be improved and the time involved in diagnosing issues can be reduced.

In addition to recording information onto the web, the same information can also be communicated to the controller 108 for storage in a storage module 110, which can be implemented with one or multiple storage devices. Digitally storing the information allows for electronic access of the information for various purposes, such as for root cause determination or for corrective action determination. the information stored in the storage module 110 can also be used for other types of analysis, such as product development, environmental impact assessment, yield optimization, scrap minimization, and so forth.

Figure 2:
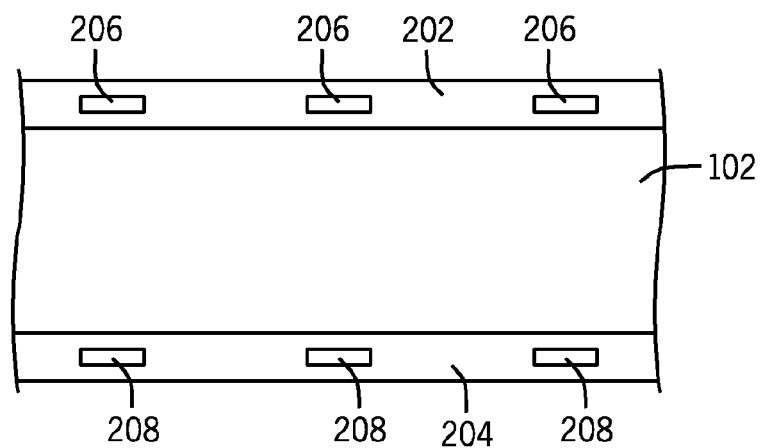
FIG. 2 is a schematic diagram of a web having excess trim regions onto which manufacturing process-related information can be recorded digitally or otherwise, in accordance with some implementations.

In accordance with some implementations, as noted above, information recorded onto the web 102 is recorded onto an excess trim region of the web 102. In some examples, as shown in FIG. 2, there can be two excess trim regions 202 and 204 on the two side portions of the web 102. In other examples, excess trim regions can be provided elsewhere on the web 102. Since target products are not intended to be manufactured in the excess trim regions of the web 102, such excess trim regions can be used for recording the various information discussed above, including quality issue information and process parameter information.

As shown in FIG. 2, recorded information in the excess trim region 202 is represented as 206, while recorded information in the excess trim region 204 is represented as 208.

The recorded information 206 or 208 in the respective excess trim region 202 or 204 can be printed periodically, intermittently, or in response to some other event (e.g. detection of a quality issue). The timing intervals for the recorded information 206 and 208 can be controlled by the controller 108, such as based on input settings provided by a user or provided from another source.

In some examples, the recorded information (206 or 208) in the excess trim region (202 or 204) of the web 102 can include non-directional encoded information. The non-directional encoded information allows the information to be read when the web 102 moves in either direction (such as left to right or right to left in FIG. 2). In a web manufacturing process according to some examples, the material produced first in an upstream processing stage is processed in a downstream processing stage last. For example, if the upstream processing stage produces materials A, B, and C (in that sequence), then the downstream processing stage would process C first, followed by B, and followed by A. Thus, it is desirable to be able to read the recorded information in either direction of web travel, from either the excess trim region 202 or 204.

The non-directional encoded information can be designed by making the encoded information symmetrical (with respect to an axis that is perpendicular to the direction of travel of the web 102) such that the information can be read in both web travel directions. Basically, in some examples, the recorded information is recorded twice, once in a first direction of web travel, and once as a mirrored version so that the recorded information can be read in the opposite web travel direction. In other examples, instead of recording the information twice (a regular version and a mirrored version), different markings can be recorded onto the web 102 at the beginning and at the end of a given processing stage, such that such markings can be used to determine the direction of web travel so that the recorded information can be properly interpreted by a reader.

Figure 3:
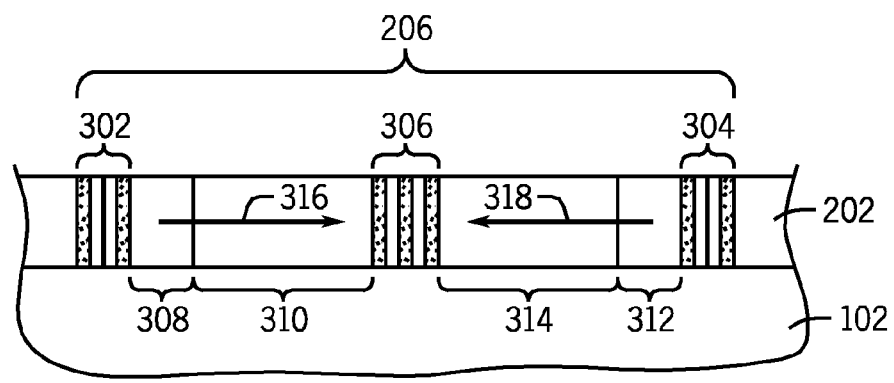
FIG. 3 is a schematic diagram of an example type of non-directional recorded information that can be recorded onto a web, in accordance with some implementations.

FIG. 3 shows an example of symmetric encoded information 206 provided in the excess trim region 202. Note that the recorded information 208 in the excess trim region 204 can have a similar format. The symmetric encoded information 206 can be read from either travel direction of the web 102 (316 or 318 in FIG. 3). The symmetric encoded information 206 has a start code 302 at a first end, and a start code 304 at a second, opposite end. An end code 306 is provided between the start codes 302 and 304. The start code 302 or 304 is used to indicate the start of recorded information immediately following the start code. The end code 306 indicates the end of the recorded information. In examples according to FIG. 3, each of the start code and end code can have a corresponding combination of bars for indicating that the respective code is a start code or an end code. In other examples, other formats of the start codes and end code can be used.

Between the start code 302 and end code 306, further codes include the type of information (308), and the corresponding event data (310). The type information 308 can identify a type of the recorded information, such as whether the event data 310 includes quality issue information, or parameter information, or both. The event data 310 includes various specific information, such as process parameter measurements, and/or information pertaining to the defect (e.g. web break or tear, coating slug, equipment malfunction, process drift, etc.).

Between the start code 304 and end code 306, type information 312 and event data 314 are provided, which can be a mirrored version of the type information 308 and event data 310, respectively. The type information 312 and event data 314 contain identical content as the type information 308 and event data 310, respectively, except in a different directional arrangement (mirrored) such that the information can be read in an opposite travel direction.

The type information 308 and event data 310 are to be read when the web 102 travels in the direction indicated by an arrow 316, while the type information 312 and event data 314 are to be read when the web 102 travels in the opposite direction, as indicated by the arrow 318.

Figure 4:
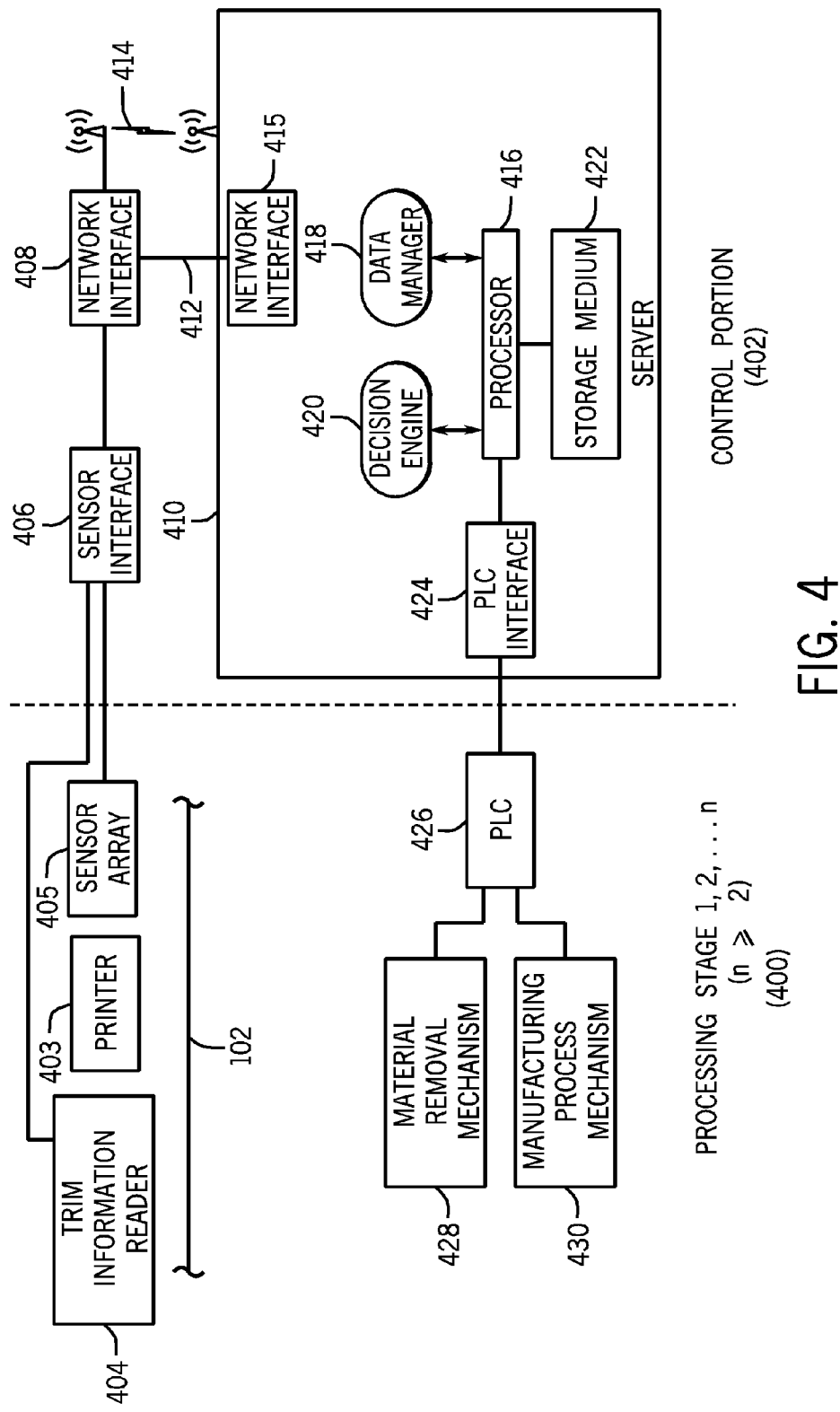
FIG. 4 is a block diagram of an example arrangement that includes a processing stage and an associated control portion, according to some implementations.

FIG. 4 illustrates an example arrangement that includes a processing stage 400 of a web manufacturing infrastructure, and an associated control portion 402 (which can be part of the controller 108 of FIG. 1, for example). Although a specific arrangement of the processing stage 400 and associated control portion 402 is depicted in FIG. 4, it is noted that in alternative examples, different arrangements can be provided.

The processing stage 400 has a trim information reader 404 (which can be an optical sensor or other type of sensor) that is able to read encoded information on the web 102 (such as encoded information 206 or 208 in FIG. 2). The processing stage 400 also has a sensor array 405, which can include one or multiple sensors for measuring various process parameters associated with a manufacturing process to be applied by the processing stage 400. The processing stage 400 can also include a printer 403 (or other type of recording device) to print or otherwise record information onto the web.

The data (collectively referred to as "sensor data") detected by the reader 404 and sensor array 405 is provided to a sensor interface 406 that is part of the control portion 402. The sensor data in turn is provided by the sensor interface 406 to a network interface 408, which is communicated to a server 410, either over a wired connection 412 or using a wireless link 414.

The server 410, which can be implemented with a computer or a collection of computers, includes one or multiple processors 416. Sensor data from the network interface 408 is received through a network interface 415 in the server 410

The server 410 also includes a data manager 418 to receive sensor data through the network interface 415 and to manage the sensor data, such as to store the sensor data in a storage medium 422 or to communicate the sensor data to a remote entity. The server 410 also includes a decision engine 420 to determine any action to take in response to the sensor data (such as a corrective action discussed above). The decision engine 420 and data manager 418 are executable on the processor (or processors) 416.

The server 410 further includes a programmable logic controller (PLC) interface 424, which is coupled to a PLC 426 that is part of the processing stage 400. The PLC 426 is coupled to various mechanisms of the processing stage 400, to control operations of such mechanisms. For example, the PLC 426 can be coupled to a material removal mechanism 428, which can perform web material removal to remove a portion of the web 102 that has a quality issue.

The processing stage 400 also includes a manufacturing process mechanism 430, which can be controlled by the PLC 426 to apply a respective manufacturing process (e.g. material deposition, coating, plating, printing, laminating, curing, etc.) of the processing stage 400.

In some examples, the PLC 426 can instruct the material removal mechanism 428 and manufacturing process mechanism 430 according to commands provided from the server 410 under control of the decision engine 420.

In some examples, the processing stage 400 can be a processing stage that is downstream of an upstream processing stage. The upstream processing stage recorded information (e.g. 206 or 208 in FIG. 2) onto the web 102, which is detected by the trim information reader 404 of the downstream processing stage 400 and communicated to the server 410 for processing. This allows the downstream processing stage 400 to read the recorded information on the web 102, and to take any appropriate action in the downstream manufacturing process as performed by the downstream processing stage 400. For example, the action that can be taken can be a corrective action to remove a web portion having the quality issue, which can be performed by the material removal mechanism 428.

In alternative examples, instead of including a material removal mechanism (such as 428) in each processing stage, a material removal mechanism can instead by provided in a different stage, which can be referred to as a conversion stage. The conversion stage can be provided after a number of processing stages of the web manufacturing infrastructure, and the material removal mechanism in the conversion stage can perform the web material removal to address a quality issue.

In other examples, other corrective actions can be taken by the downstream processing stage 400, as determined by the decision engine 420. For example, the decision engine 420 can decide to adjust a parameter (or multiple parameters) associated with the manufacturing process mechanism 430, such as a temperature setting, a pressure setting, a humidity setting, and so forth.

In further examples, other corrective actions can also be specified by the decision engine 420. For example, the downstream processing stage 400 can be controlled to not apply its corresponding manufacturing process onto the web portion having the quality issue. Skipping the manufacturing process with respect to the web portion having the quality issue can result in cost savings, since resources of a downstream processing stage (or multiple downstream processing stages) are not wasted in processing a web portion that would likely have to be discarded anyway.

Figure 5:
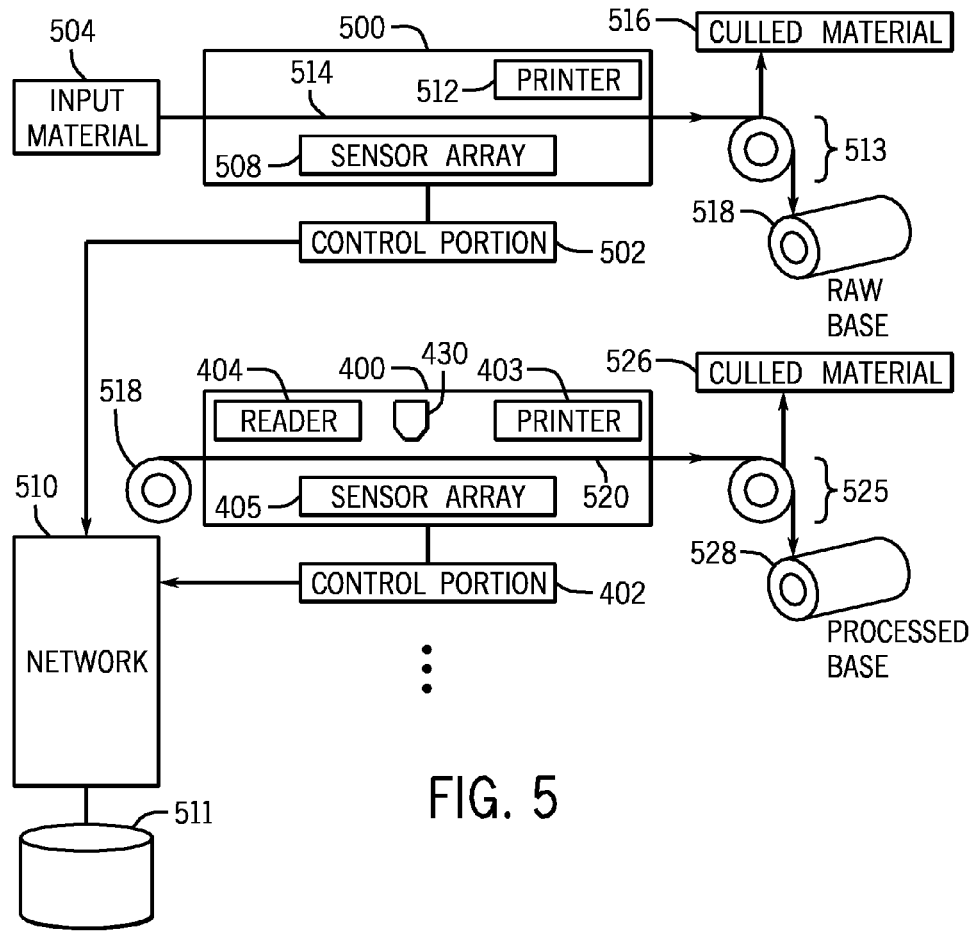
FIG. 5 is a block diagram of an example arrangement that includes multiple processing stages and associated control portions, sensors, readers, and printers, according to some implementations.

FIG. 5 illustrates an example arrangement that includes multiple processing stages and corresponding control portions. The processing stages depicted in FIG. 5 include an upstream processing stage 500 and the downstream processing stage 400 of FIG. 4. The upstream processing stage 500 is associated with a control portion 502, while the downstream processing stage 400 is associated with the control portion 402. Although not shown, there can be multiple downstream processing stages.

In some examples, the processing stages 500 and 400 are used for manufacturing photo paper (onto which photographic images can be printed). The upstream processing stage 500 includes input material 504 (such as pulp), which is fed to the upstream processing stage 500 (e.g. a paper making machine). The upstream processing stage 500 includes a sensor array 508, which can be used to measure various parameters associated with the manufacturing process applied by the upstream processing stage 500. The measured information from the sensor array 508 is provided to the control portion 502, which can determine if a quality issue is present. The control portion 502 is able to communicate the sensor information from the sensor array 508 to a network 510, which allows the sensor information to be stored on a network storage module 511, for example.

In addition, the control portion 502 can control a printer 512 in the upstream processing stage 500 to print encoded information onto a web 514 processed by the upstream processing stage 500.

As shown in FIG. 5, the web 514 output from the upstream processing stage 500 is provided to a conversion stage 513, which can cull any web portion having a quality issue (as detected by the control portion 502). Culled web material (516) is redirected to a different destination, while the remainder of the web 514 is provided as a roll of trim encoded raw base 518. "Trim encoding" refers to recording information relating to a manufacturing process of a processing stage onto an excess trim region of a web.

The trim encoded raw base 518 is used as the input to the downstream processing stage 400, which has the manufacturing process mechanism 430 to apply a corresponding manufacturing process. Note that the trim encoded raw base 518 is fed to the downstream processing stage 400 in an automated manner. The downstream processing stage 400 has the trim information reader 404 (to read the trim encoded information on a web 520). The trim information reader 404 outputs the trim encoded information to the control portion 402.

The downstream processing stage 400 also has the sensor array 405 to measure parameter data, which can be communicated to the control portion 402. The control portion 402 can determine, based on the trim encoded information and parameter data, whether a quality issue is present and a corresponding corrective action should be taken. The control portion 402 can also provide parameter data measured by the sensor array 405 to the network 510.

In addition, the control portion 402 can cause the printer 403 to print trim encoded information onto the web 520. The web 520 from the output of the downstream processing stage 400 is provided to a conversion stage 525, which can cull a portion of the web 520 having a quality issue. Any culled web material (526) is redirected to a different destination, while the remainder of the web 520 is output as a roll of trim encoded processed base 528, which can be fed to the next processing stage.

Further processing can be performed in further downstream stages according to some implementations, until the final output of the web manufacturing process is produced.

Figure 6:
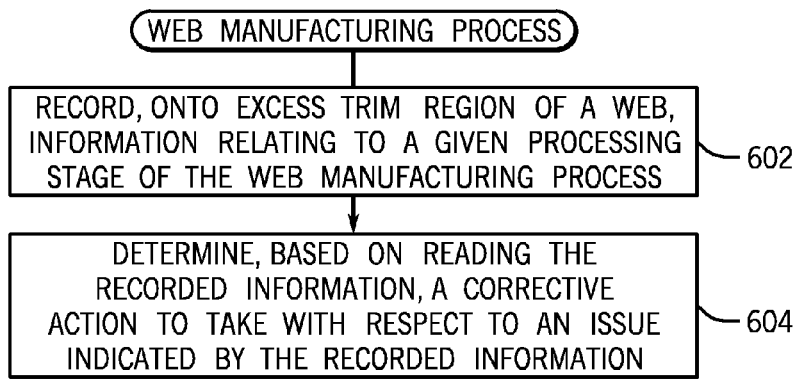
FIG. 6 is a flow diagram of a web manufacturing process, according to some implementations.

FIG. 6 is a general flow diagram of a web manufacturing process according to some implementations. The process includes recording (at 602), onto an excess trim region of a web that is a subject of the web manufacturing process, information relating to a given processing stage of the web manufacturing process. The process of FIG. 6 next determines (at 604), based on reading the recorded information, a corrective action to take with respect to an issue indicated by the recorded information. The corrective action can be taken by the given processing stage, or by a downstream processing stage. The determination at 604 can be performed by the controller 108 of FIG. 1, or by a control portion depicted in FIG. 4 or 5.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of a web manufacturing process, comprising:
   recording, onto an excess trim region of a web that is a subject of the web manufacturing process, information relating to a first processing stage of the web manufacturing process;
   determining, based on reading the recorded information, a corrective action to take with respect to an issue indicated by the recorded information; and
   receiving parameter data from a sensor associated with the first processing stage, wherein the recorded information is based on the parameter data, and where the parameter data includes a measured parameter that relates to manufacturing processing performed by the first processing stage.

2. The method of claim 1, further comprising performing, by a second processing stage that is downstream of the first processing stage, the corrective action.

3. The method of claim 2, wherein performing the corrective action comprises adjusting at least one parameter of the second processing stage based on the recorded information.

4. The method of claim 1, wherein recording the information comprises recording a barcode.

5. The method of claim 4, wherein recording the barcode comprises recording a non-directional barcode that is recognizable by a reader in both traveling directions of the web.

6. The method of claim 1, wherein the issue is a quality issue associated with a portion of the web, and wherein the corrective action compensates for the quality issue.

7. The method of claim 6, further comprising:
   identifying, based on the recorded information, a location of the portion of the web that has the quality issue.

8. The method of claim 1, wherein recording the information comprises repeatedly recording information relating to the measured parameter associated with the first processing stage at multiple positions in the excess trim region.

9. A web manufacturing system comprising:
   web manufacturing infrastructure having a plurality of processing stages to apply corresponding manufacturing processes on a web,
   wherein a first of the plurality of processing stages is to record information relating to a quality issue onto an excess trim region of the web, wherein the first processing stage is to further record parameter data onto the excess trim region of the web, where the parameter data relates to a parameter of a manufacturing processing performed by the first processing stage, the parameter measured by a sensor of the first processing stage, and
   wherein a second of the plurality of processing stages is to perform a corrective action in response to the recorded information to address the quality issue.

10. The web manufacturing system of claim 9, wherein the second processing stage is downstream of the first processing stage.

11. The web manufacturing system of claim 9, wherein the corrective action includes modifying a parameter relating to a manufacturing process performed by the second processing stage.

12. The web manufacturing system of claim 9, wherein the corrective action includes culling a portion of the web having the quality issue.

13. The web manufacturing system of claim 9, further comprising a storage medium to store parameter data measured by sensors of the plurality of processing stages.

14. The web manufacturing system of claim 9, wherein the first processing stage has a printer to record the information relating to the quality issue onto the excess trim region of the web.

15. The web manufacturing system of claim 9, wherein the recorded information includes a first version to be read when the web travels in a first direction, and a mirrored version of the first version to be read when the web travels in a second, opposite direction.

16. The web manufacturing system of claim 9, wherein the recorded information comprises a barcode recognizable by a barcode reader of the second processing stage in both traveling directions of the web.

17. A first web manufacturing processing stage comprising:
   a sensor to measure parameter data relating to at least one parameter of a manufacturing process to be performed by the first web manufacturing processing stage with respect to a web;
   a printer to record, onto an excess trim region of the web, information relating to the measured parameter data and information pertaining to a quality issue associated with the web;
   a reader to read recorded information in the excess trim region of the web as recorded by a second web manufacturing processing stage, wherein the read recorded information is based on parameter data measured by a sensor of the second web manufacturing processing stage that relates to a manufacturing process performed by the second web manufacturing processing stage; and
   a mechanism to determine a corrective action based on the read recorded information.

18. The first web manufacturing processing stage of claim 17, wherein the recorded information relating to the measured parameter and the recorded information pertaining to the quality issue recorded by the printer comprise a barcode readable by a machine reader in both traveling directions of the web.

* * * * *